(12) United States Patent
Lantz et al.

(10) Patent No.: US 7,913,376 B2
(45) Date of Patent: Mar. 29, 2011

(54) METHOD OF FORMING AN ACTUATING MECHANISM FOR A PROBE STORAGE SYSTEM

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 11/955,549

(22) Filed: Dec. 13, 2007

(65) Prior Publication Data

US 2009/0151152 A1   Jun. 18, 2009

(51) Int. Cl.
*H01F 7/122* (2006.01)
*H01F 7/127* (2006.01)

(52) U.S. Cl. ......... 29/606; 29/607; 29/602.1; 359/198.1

(58) Field of Classification Search .................... 29/606, 29/607, 594, 602.1, 854; 310/40 MM; 359/198.1; 156/274.4
See application file for complete search history.

(56) References Cited

U.S. PATENT DOCUMENTS

| | | | |
|---|---|---|---|
| 4,470,131 A * | 9/1984 | Hatayama et al. .......... | 29/607 X |
| 5,009,473 A | 4/1991 | Hunter et al. | |
| 5,834,864 A | 11/1998 | Hesterman et al. | |
| 5,986,381 A | 11/1999 | Hoen et al. | |
| 6,501,210 B1 | 12/2002 | Ueno | |
| 6,583,524 B2 | 6/2003 | Brandt | |
| 6,639,313 B1 | 10/2003 | Martin et al. | |
| 6,911,667 B2 | 6/2005 | Pichler et al. | |
| 6,953,985 B2 | 10/2005 | Lin et al. | |
| 6,969,635 B2 | 11/2005 | Patel et al. | |
| 7,132,721 B2 | 11/2006 | Platt et al. | |
| 7,372,025 B2 | 5/2008 | Hoen et al. | |
| 2003/0057803 A1 | 3/2003 | Hartwell | |
| 2004/0245462 A1 | 12/2004 | Binnig et al. | |
| 2007/0137780 A1 * | 6/2007 | Park et al. .................. | 156/274.4 |
| 2007/0268099 A1 | 11/2007 | Jeong et al. | |

FOREIGN PATENT DOCUMENTS

| | | | | |
|---|---|---|---|---|
| JP | 04046538 A * | 2/1992 | ...................... | 29/606 |

OTHER PUBLICATIONS

J. Fernando Alfaro and Gary K. Fedder, Actuation for Probe-Based Mass Data Storage, p. 1-4, Carnegie Mellon University, Pittsburgh.

(Continued)

*Primary Examiner* — A. Dexter Tugbang
(74) *Attorney, Agent, or Firm* — Cantor Colburn LLP; Stephen Kaufman

(57) ABSTRACT

A method of forming an actuating mechanism for a probe storage system includes providing a scanner chip having a main body including first and second outer surfaces and first and second coil mounting cavities. First and second coils are positioned in respective ones of the first and second coil mounting cavities. First and second magnet receiving pockets are formed in a first plate with first and second magnets being positioned in corresponding ones of the first and second magnet receiving pockets. The first plate is arranged relative to one of the first and second outer surfaces of the scanner chip with the first and second magnets registering with respective ones of the first and second coils. The first plate is spaced from the one of the first and second outer surfaces by a gap of less than about 10 microns.

5 Claims, 3 Drawing Sheets

OTHER PUBLICATIONS

Y. Lu et al., Design, Fabrication and Control of a Micro X-Y Stage with Large Ultra-thin Film Recoding Media Platform, Proceedings of the 2005 IEEE/ASME International Conference on Advanced Intelligent Mechatronics, Jul. 2005, p. 19-24, Monterey.

Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.

* cited by examiner

METHOD OF FORMING AN ACTUATING MECHANISM FOR A PROBE STORAGE SYSTEM

BACKGROUND OF THE INVENTION

1. Field of the Invention

This invention relates to the art of probe storage systems and, more particularly, to a method of forming an actuating mechanism for a parallel probe storage system.

2. Description of Background

Parallel probe-based data-storage systems are currently being developed for future data-storage applications. A parallel probe-based system employs a large array of atomic-force microscopic probes that read, write and erase data on a storage medium carried by an X/Y scanning system. The large array of probes enables very high storage densities to be achieved. Moreover, by operating the array of probes in parallel, high data transfer rates are also achievable. The high storage capacity, combined with rapid transfer rates, enables the storage system to be built into a small package that is ideal for mobile storage applications.

Mobile storage systems present a variety of engineering challenges. First, mobile storage systems must be robust against vibration and shock. Second, mobile storage systems must be capable of operating on a restricted power budget. A mobile probe based storage system should be capable of maintaining sub-nanometer tracking performance while being subjected to mechanical shocks that create accelerations that approach 10's of g's. However, making a mechanical device more robust, i.e., capable of withstanding high accelerations, typically requires making components stiffer. By making the components stiffer, power consumption for certain components, e.g., actuators, will increase thereby rendering the device less desirable for mobile applications.

Conventionally, power efficiency and damping out-of-plane shock were achieved by placing magnets close to associated coils used to drive a scan table. The distance between the magnets and the coils was minimized by etching holes through a top plate and a base plate. The magnets were positioned in the holes flush with a surface of the plates, and placed, in a spaced relationship, over the coils. However, maintaining a minimal desirable gap is difficult because of an inherent roughness of the magnets. That is, maintaining a gap of less then 10 microns between the magnets and the coils is currently not achievable given the inherent surface imperfections present in the magnets.

SUMMARY OF THE INVENTION

The shortcomings of the prior art are overcome and additional advantages are provided through the provision of a method of forming an actuating mechanism for a probe storage system. The method includes positioning a first coil in a first coil mounting cavity of a scanner chip. The first coil being selectively shiftable relative to the scanner chip. The first coil having a first connector lead. The scanner chip further includes a main body having first and second outer surfaces, and a second coil mounting cavity. A second coil is position in the second coil mounting cavity. The second coil includes a second connector lead and is selectively shiftable relative to the scanner chip. First and second magnet receiving pockets are formed in a first plate with each of the first and second magnet receiving pockets including a corresponding base portion. First and second magnets are positioned in respective ones of the first and second magnet receiving pockets. The first plate is arranged relative to the one of the first and second outer surfaces of the scanner chip with the first and second magnets registering with respective ones of the first and second coils. The first plate is spaced from the one of the first and second outer surfaces by a gap of less than about 10 microns.

Additional features and advantages are realized through the techniques of exemplary embodiments of the present invention. Other embodiments and aspects of the invention are described in detail herein and are considered a part of the claimed invention. For a better understanding of the invention, with advantages and features thereof refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features thereof, by way of example with reference to the drawings.

DETAILED DESCRIPTION OF THE INVENTION

Figure 1:
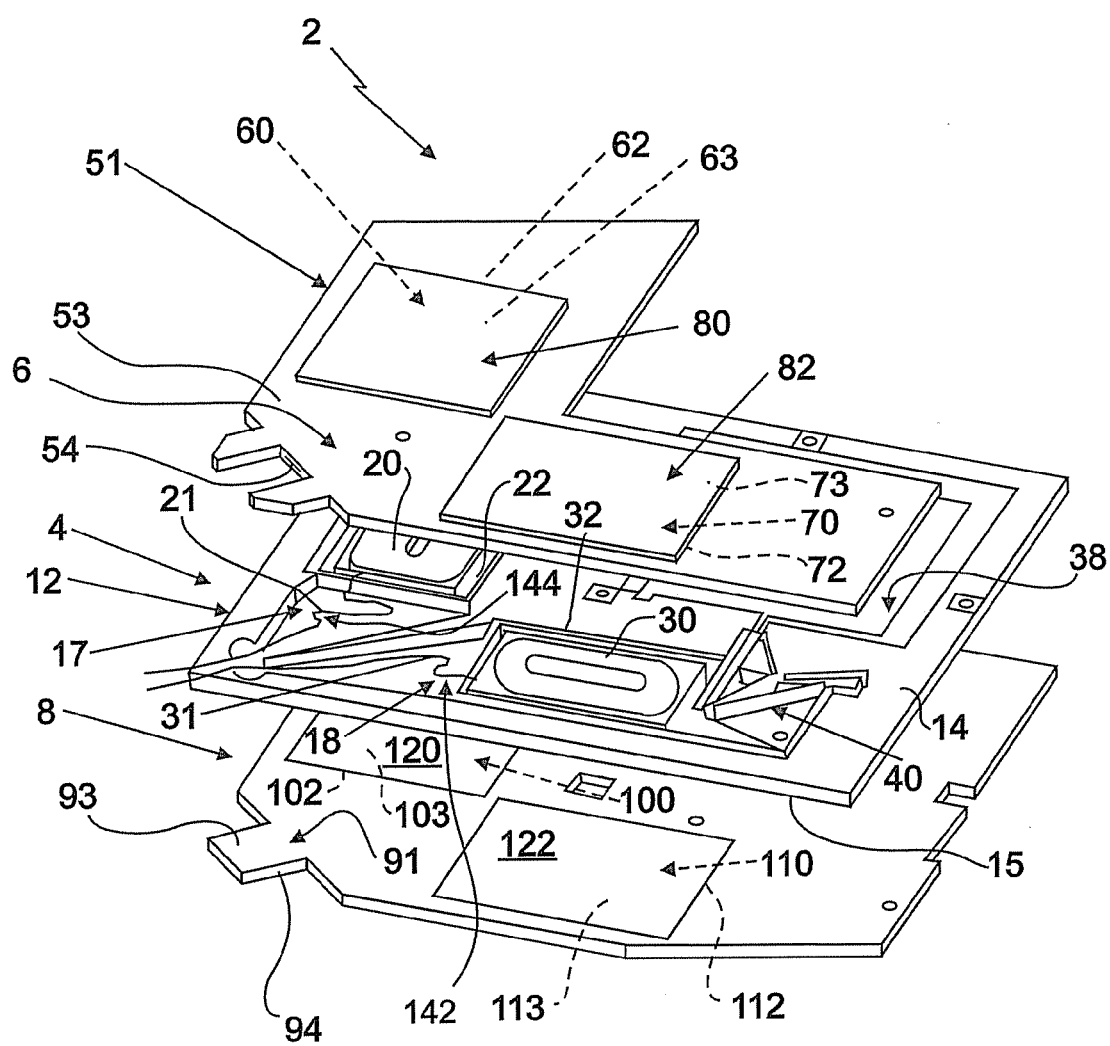
FIG. 1 is an exploded perspective view of an actuating mechanism for a probe-based storage device constructed in accordance with an exemplary embodiment of the present invention.
Figure 2:
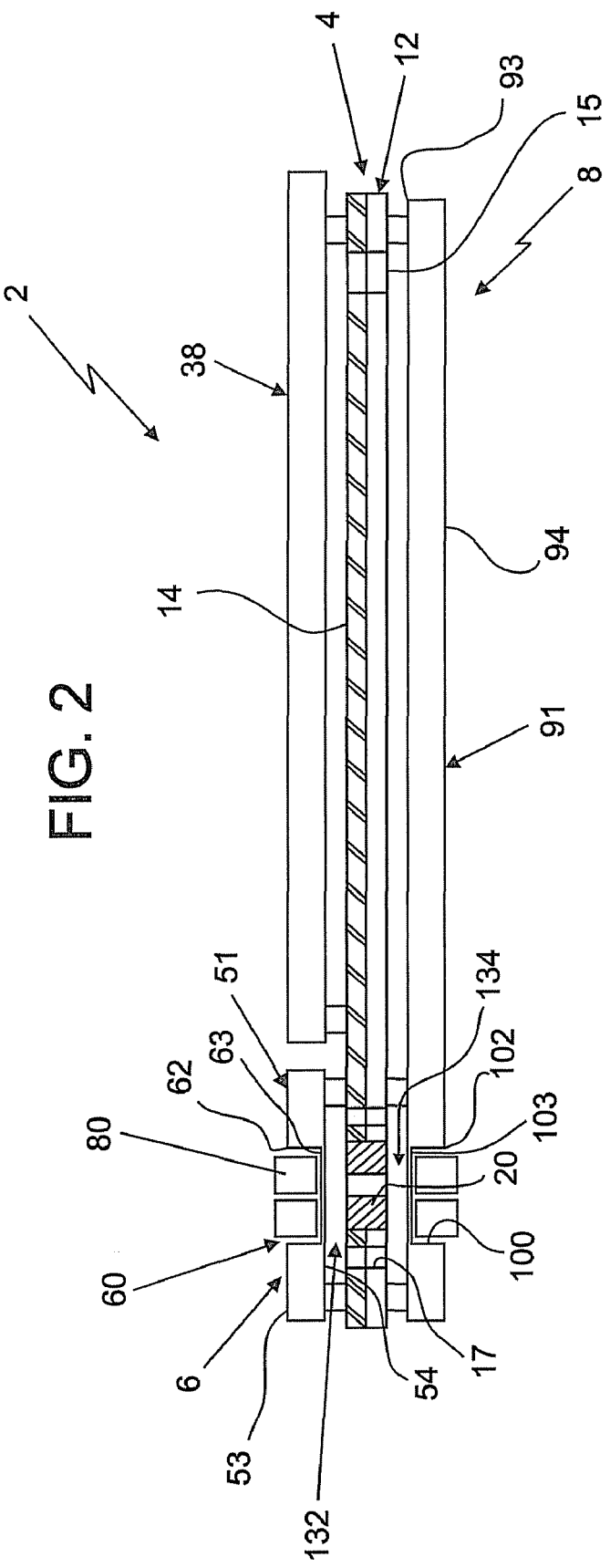
FIG. 2 is a cross-sectional side view of the actuating mechanism of FIG. 1.
Figure 3:
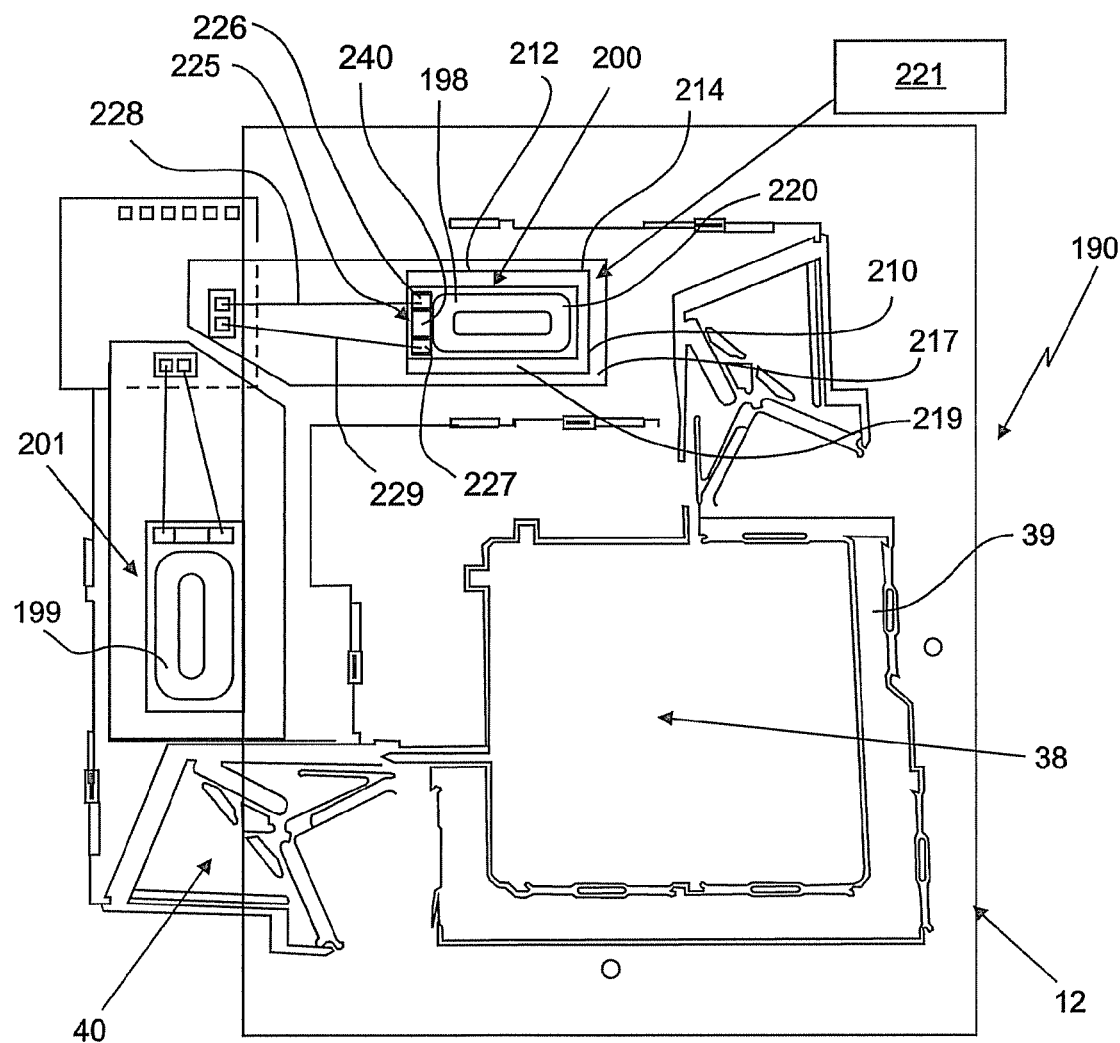
FIG. 3 is a plan view of a scanner chip portion of an actuating mechanism constructed in accordance with another exemplary embodiment of the present invention.

With initial reference to FIGS. 1-3 an actuating mechanism for a probe based storage system constructed in accordance with an exemplary embodiment of the present invention is generally indicated at 2. Actuating mechanism 2 includes a scanner chip 4 that is sandwiched between a top plate 6 and a bottom plate 8. Scanner chip 4 includes a main body 12 having a first surface 14 and a second, opposing surface 15. As shown, first and second coil mounting cavities 17 and 18 are formed in main body 12. A first coil 20, having a first connector lead 21, is shiftably mounted within first coil mounting cavity 17. More specifically, first coil 20 is mounted within a first shuttle or frame 22 that is shiftable relative to main body 12. In a similar manner, a second coil 30, having a second connector lead 31, is moveably mounted within main body 12. In a manner also similar to that described above, second coil 30 is mounted within a second shuttle or frame 32. First and second coils 20 and 30 are operatively connected to a scan table 38. Scan table 38 is mounted in a moveable frame 39 and connected to first and second coils 20 and 30 through corresponding first and second transmission mechanisms 40 and 42.

In accordance with one aspect of the present invention, top plate 6 includes a main body 51 having first and second opposing planar surfaces 53 and 54. A first magnet receiving pocket 60 is formed within first planar surface 53 of main body 51. First magnet receiving pocket 60 includes a peripheral edge 62 and a base portion 63. At this point, it should be understood that by "pocket", it is meant that a recess is formed in main body 51 that is surrounded on all sides by peripheral edge 62 and base portion 63, yet includes an opening for receiving additional elements as will be discussed more fully below. That is, it should be clear that the use of the term "pocket" means that a recess is formed that does not extend entirely through main body 51. In any event, in addition to first magnet receiving pocket 60, top plate 6 is provided with a second magnet receiving pocket 70 have a peripheral edge 72 and a base portion 73. As shown, a first magnet pair 80 is positioned within first magnet receiving pocket 60 so as to be substantially in contact with base portion 63. Likewise, a second magnet pair 82 is positioned within second magnet receiving pocket 70 so as also to be substantially in contact with base portion 73.

In a manner similar to that described above, bottom plate 8 includes a main body 91 having first and second opposing planar surfaces 93 and 94. A third magnet receiving pocket 100 is formed in second planar surface 94. Third magnet receiving pocket 100 includes a peripheral edge 102 and a base portion 103. Similarly, a fourth magnet receiving pocket 110 having a peripheral edge 112 and a base portion 113 is also formed within second planar surface 94. In a manner also similar to that described above, a third magnet pair 120 is positioned within third magnet receiving pocket 100 so as to be substantially in contact with base portion 103 and a fourth magnet pair 122 is positioned within fourth magnet receiving pocket 110 so as to be substantially in contact with base portion 113.

With this construction, top and bottom plates 6 and 8 are arranged in a spatial relationship relative to respective ones of first and second opposing surfaces 14 and 15 of scanner chip 4. As best shown in FIG. 2, scanner chip 4 is sandwiched between top and bottom plates 6 with a gap 132 being present between second planar surface 54 and first surface 14. A similar gap 134 is present between first planar surface 93 and second surface 15. In accordance with the exemplary embodiment shown, gaps 132 and 134 are less than about 10 microns. Moreover, by mounting magnets 80, 82 and 120, 122 within pockets, gaps 132 and 134 can be maintained at about 5 microns or less. By minimizing the size of gaps 132 and 134 the damping of actuating mechanism 2 for out-of-plane shock can be controlled. Moreover, by mounting magnet pairs 80, 82 and 120, 122 within pockets, a hermetic seal is no longer required at these mounting locations for actuating mechanism 2.

In accordance with another aspect of the present invention, first and second coils 20 and 30 are provided with a strain relief system that enables first and second shuttles 22 and 32 to shift freely within the first and second coil mounting cavities 17 and 18. More specifically, first connector lead 21 includes a strain relief portion 142 having a generally S-shaped configuration, while second connector lead 31 is provided with a strain relief portion 144 having a generally L-shaped configuration. With this arrangement, first and second coils 20 and 30 can freely shift within first and second coil mounting cavities 17 and 18 without experiencing any restriction on motion derived from an inherent stiffness of first and second coil leads 21 and 31 and thus will have little or no impact on actuating mechanism 2. At this point, it should be understood that while strain relief portion 142 is described as having an S-shape configuration and strain relief portion 144 is described as having an L-shaped configuration, the particular configurations can vary. That is, both strain relief portions 142 and 144 can be either S-shaped or L-shaped in configuration or, the particular configuration can take on other, non-restrictive geometries.

In accordance with yet another aspect of the present invention, illustrated in FIG. 3, a scanner chip 190 includes first and second coils 198 and 199 that are mounted within corresponding first and second covered shuttles 200 and 201. As each shuttle 200, 201 is identical, a detailed description will follow with respect to first shuttle 200 with an understanding that second shuttle 201 includes corresponding structure. As shown, shuttle 200 includes a main body 210 having first and second opposing side walls 212 and 213 interconnected by a rear wall 214 and a bottom wall 215 that collectively define a coil receiving portion 217. A coil 220 is mounted within coil receiving portion 217 and covered by a top wall or cover 221. Shuttle 200 is shown to include a bonding fixture 225 that serves as a connecting block for coil 220. Bonding fixture 225 includes first and second soldering pads 226 and 227 that receive first and second connector lead strands 228 and 229, as well as a bonding pad 240 that serves as an interface with coil 220. Shuttle 200 facilitates the mounting of coils to scanner chip 4 thereby providing additional freedom of movement, ease of connections, and ease of hermetic sealing.

While the preferred embodiments of the invention have been described as including a total of eight magnets (four magnet pairs), it will be understood that the device will also function when magnets are omitted from either top plate 6 or bottom plate 8. It will also be understood, that magnets, in either the top or bottom plate, can also be replaced by a soft magnetic material. In addition, it will be understood that a soft magnetic material can be placed under the magnets to increase the power efficiency of the actuating mechanism.

While the preferred embodiments have been shown and described, it will be understood that those skilled in the art, both now and in the future, may make various improvements and enhancements which fall within the scope of the claims which follow. These claims should be construed to maintain the proper protection for the invention first described.

The invention claimed is:

1. A method of forming an actuating mechanism for a probe storage system, the method comprising:
    positioning a first coil in a first coil mounting cavity of a scanner chip, the first coil having a first connector lead, wherein the scanner chip further includes a main body having first and second outer surfaces, and a second coil mounting cavity, the first coil being selectively shiftable relative to the main body;
    positioning a second coil in the second coil mounting cavity, the second coil having a second connector lead and being selectively shiftable relative to the scanner chip;
    forming first and second magnet receiving pockets in a first plate, each of the first and second magnet receiving pockets including a corresponding base portion;
    positioning first and second magnets in the first and second magnet receiving pockets, respectively; and
    arranging the first plate relative to one of the first and second outer surfaces of the scanner chip with the first and second magnets registering with respective ones of the first and second coils, the first plate being spaced from the one of the first and second outer surfaces by a gap of less than about 10 microns.

2. The method of claim 1, further comprising:
    forming third and fourth magnet receiving pockets in a second plate, each of the third and fourth magnet receiving pockets having a corresponding base portion;
    positioning third and fourth magnets in the third and fourth magnet receiving pockets, respectively; and
    arranging the second plate relative to the other of the first and second outer surfaces of the scanner chip with the third and fourth magnets registering with respective ones of the first and second coils, the second plate being spaced from the other of the first and second outer surfaces by a gap of less than about 10 microns.

3. The method according to claim 1, further comprising: providing each of the first and second connector leads with a corresponding strain relief portion that allows the first and second coils to selectively move within the first and second coil receiving pockets, respectively.

4. The method of claim 1, further comprising:
positioning a shuttle having first and second side walls connected by a rear wall, and a base portion in the first coil receiving cavity;
mounting the first coil in the shuttle; and
covering the coil with a top wall that is fastened to the shuttle.

5. The method of claim 4, further comprising: connecting the first connector lead to a bonding fixture mounted to the shuttle, the bonding fixture including first and second soldering pads and a bonding pad.

* * * * *